United States Patent
Xu et al.

(10) Patent No.: US 12,232,185 B2
(45) Date of Patent: Feb. 18, 2025

(54) RANDOM ACCESS METHOD AND TERMINAL DEVICE

(71) Applicant: GUANGDONG OPPO MOBILE TELECOMMUNICATIONS CORP., LTD., Dongguan (CN)

(72) Inventors: Weijie Xu, Dongguan (CN); Zuomin Wu, Dongguan (CN); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 351 days.

(21) Appl. No.: 17/731,121

(22) Filed: Apr. 27, 2022

(65) Prior Publication Data

US 2022/0256619 A1 Aug. 11, 2022

Related U.S. Application Data

(63) Continuation of application No. PCT/CN2019/123107, filed on Dec. 4, 2019.

(51) Int. Cl.
*H04W 74/0833* (2024.01)
*H04L 5/14* (2006.01)
(Continued)

(52) U.S. Cl.
CPC ....... *H04W 74/0841* (2013.01); *H04L 5/1469* (2013.01); *H04W 72/0446* (2013.01); *H04W 74/006* (2013.01); *H04W 74/0866* (2013.01)

(58) Field of Classification Search
CPC ............. H04W 72/1268; H04W 72/23; H04W 74/004; H04W 74/006; H04W 72/0446;
(Continued)

(56) References Cited

U.S. PATENT DOCUMENTS

| | | | |
|---|---|---|---|
| 11,089,591 B2 * | 8/2021 | Lin | H04L 5/0053 |
| 11,284,451 B2 * | 3/2022 | Cirik | H04W 72/23 |

(Continued)

FOREIGN PATENT DOCUMENTS

| | | |
|---|---|---|
| CN | 110324903 A | 10/2019 |
| CN | 111615209 A | 9/2020 |

(Continued)

OTHER PUBLICATIONS

International Search Report issued in corresponding International Application No. PCT/CN2019/123107, mailed May 27, 2020, 31 pages.

(Continued)

*Primary Examiner* — Frank Duong
(74) *Attorney, Agent, or Firm* — BAYES PLLC

(57) ABSTRACT

Provided are a method for determining random access and a terminal device, which enable effective transmission of Msg A in a 2-step random access procedure. The method includes: determining, by a terminal device based on a predetermined rule, whether to send an uplink channel on a transmission occasion corresponding to the uplink channel in a first message of a 2-step random access procedure, where the uplink channel includes a physical random access channel PRACH and a physical uplink shared channel PUSCH; not sending the PRACH and not sending the PUSCH by the terminal device in a case that the terminal device determines not to send the PRACH; and not sending the PUSCH by the terminal device and sending or not sending the PRACH by the terminal device in a case that the terminal device determines not to send the PUSCH.

12 Claims, 7 Drawing Sheets

(51) Int. Cl.
*H04W 72/0446* (2023.01)
*H04W 74/00* (2009.01)
*H04W 74/08* (2009.01)

(58) Field of Classification Search
CPC ......... H04W 74/0833; H04W 74/0836; H04W 74/0838; H04W 74/0841; H04W 74/0866; H04L 5/1469
See application file for complete search history.

(56) References Cited

U.S. PATENT DOCUMENTS

| | | | |
|---|---|---|---|
| 11,576,210 B2* | 2/2023 | Lee | H04W 52/50 |
| 11,723,074 B2* | 8/2023 | Tian | H04W 74/0833 370/328 |
| 2019/0149269 A1 | 5/2019 | Chatterjee et al. | |
| 2019/0306857 A1 | 10/2019 | Lin | |
| 2019/0364559 A1 | 11/2019 | Han et al. | |
| 2019/0364599 A1 | 11/2019 | Islam et al. | |
| 2020/0267774 A1* | 8/2020 | Vos | H04W 74/0833 |
| 2022/0039174 A1* | 2/2022 | Dai | H04W 74/0833 |
| 2022/0053554 A1* | 2/2022 | Chen | H04W 74/006 |
| 2022/0191949 A1* | 6/2022 | Zhang | H04W 72/23 |

FOREIGN PATENT DOCUMENTS

| | | |
|---|---|---|
| EP | 3965514 A1 | 3/2022 |
| JP | 2019176476 A | 10/2019 |

OTHER PUBLICATIONS

Written Opinion of the International Searching Authority issued in corresponding International Application No. PCT/CN2019/123107, mailed May 27, 2020, 7 pages.
"3rd Generation Partnership Project; Technical Specification Group Radio Access Network; NR; Physical layer procedures for control (Release 15)", 3GPP TS 38.213 V15.10.0 (Jun. 2020), 109 pages.
"3rd Generation Partnership Project; Technical Specification Group Radio Access Network; NR; Physical layer procedures for data (Release 15)", 3GPP TS 38.214 V15.10.0 (Jun. 2020), 105 pages.
"Discussion on 2-step RACH procedure", Agenda Item: 7.2.1.2, Source: vivo, 3GPP TSG RAN WG1 #97, R1-1906125 Reno, USA, May 13-17, 2019, 8 pages.
"On Channel Structure for 2-step RACH", Agenda Item: 7.2.1.1, Source: OPPO, 3GPP TSG RAN WG1 #98bis, R1-1912650, Reno, USA, Nov. 18-22, 2019, 5 pages.
Priority Review issued in corresponding Chinese application No. 202111432147.4, mailed Mar. 27, 2023.
First Office Action issued in corresponding European application No. 19955148.2, mailed Mar. 10, 2023.
First Office Action issued in corresponding Chinese application No. 202111432147.4, mailed Apr. 11, 2023.
Qualcomm Incorporated et al., "NR-U specific aspects for 2-step RACH", R2-1914769, 3GPP TSG-RAN WG2 Meeting #107bis Chongqing, China, Oct. 14-18, 2019.
Motorola Mobility et al., "Discussion on valid RACH occasions", R1-1807274, 3GPP TSG RAN WG1 Meeting #93 Busan, Korea, May 21-25, 2018.
ZTE Corporation, "Status Report to TSG", NR_2step_RACH, RP-192414, 3GPP TSG RAN meeting #86 Sitges, Spain, Dec. 9-12, 2019.
Nokia et al., "On 2-step RACH Channel Structure", R1-1906746, 3GPP TSG RAN WG1 #97 Reno, USA, May 13-17, 2019.
Huawei et al., "Corrections on SP SRS Activation/Deactivation MAC CE", R2-1818485, 3GPP TSG-RAN WG2 Meeting 104 Spokane, USA, Nov. 12-16, 2018.
International Search Report issued in International application No. PCT/CN2019/123107, mailed May 27, 2020.
Extended European Search Report issued in corresponding European application No. 19955148.2, mailed Aug. 8, 2022.
First Office Action issued in corresponding Indian application No. 202227025343, mailed Sep. 13, 2022.
3GPP TS 38.213 V15.7.0 (Sep. 2019); Technical Specification Group Radio Access Network; NR; Physical layer procedures for control (Release 15).
First Office Action issued in corresponding Japanese application No. 2022-532864, mailed Jun. 23, 2023.
Notice of Allowance issued in corresponding Chinese application No. 202111432147.4, mailed Jul. 1, 2023.
Second Office Action issued in corresponding European application No. 19955148.2, mailed Aug. 28, 2023.
CATT, "Correction on the time gap definition", R1-1908563, 3GPP TSG-RAN WG1 Meeting #98 Prague, CZ, Aug. 26-30, 2019.

* cited by examiner

RANDOM ACCESS METHOD AND TERMINAL DEVICE

CROSS-REFERENCE TO RELATED APPLICATIONS

This application is a continuation application of International Application No. PCT/CN2019/123107, entitled "RANDOM ACCESS METHOD AND TERMINAL DEVICE" filed on Dec. 4, 2019, the contents of which is incorporated herein by reference in its entirety.

TECHNICAL FIELD

The embodiments of the present application relate to the field of communications, and particularly to a random access method and a terminal device.

RELATED ART

In a 5G system or New Radio (NR) system, a 2-step random access (2-step RA) is supported. In the 2-step random access procedure, a first message (Msg A) includes a Physical Random Access Channel (PRACH) and a Physical Uplink Shared Channel (PUSCH). A flexible slot format indicating manner in NR has an impact on transmission of Msg A.

SUMMARY

The present application provides a random access method and a terminal device.

In a first aspect, there is provided a random access method, which includes: determining, by a terminal device based on a predetermined rule, whether to transmit an uplink channel on a transmission occasion corresponding to the uplink channel in a first message of a 2-step random access procedure, wherein the uplink channel includes a physical random access channel (PRACH) and a physical uplink shared channel (PUSCH); when the terminal device determines not to transmit the PRACH, not transmitting the PRACH and not transmitting the PUSCH by the terminal device; and when the terminal device determines not to transmit the PUSCH, not transmitting the PUSCH by the terminal device and transmitting or not transmitting the PRACH by the terminal device.

In a second aspect, there is provided a random access device, and the device can perform the method in the foregoing first aspect or any optional implementations thereof Specifically, the device includes a functional module configured to perform the method in the foregoing first aspect or any possible implementation thereof.

In a third aspect, there is provided a random access device including a processor and a memory. The memory is used for storing a computer program, and the processor is configured to call and run the computer program stored in the memory to perform the method in the above-mentioned first aspect or any possible implementation of the first aspect.

In a fourth aspect, there is provided a chip including a processor. The processor is configured to call and run a computer program from a memory, to cause a device installed with the chip to perform the method in the above-mentioned first aspect or any possible implementations of the first aspect.

In a fifth aspect, there is provided a computer-readable storage medium for storing a computer program that causes a computer to perform the method in the above-mentioned first aspect or any possible implementation of the first aspect.

In a sixth aspect, there is provided a computer program product, including computer program instructions that cause a computer to perform the method in the foregoing first aspect or any possible implementation of the first aspect.

In a seventh aspect, there is provided a computer program which, when running on a computer, causes the computer to perform the method in the first aspect or any possible implementation of the first aspect.

DETAILED DESCRIPTION

The technical solutions in the embodiments of the present application will be described below in conjunction with the accompanying drawings.

The technical solutions of the embodiments of the present application can be applied to various communication systems, such as a Long Term Evolution (LTE) system, a LTE Frequency Division Duplex (FDD) system, a LTE Time Division Duplex (TDD) system, an advanced long term evolution (LTE-A) system, a New Radio (NR) system, an evolutional system of a NR system, a LTE-based access to unlicensed spectrum (LTE-U) system, a NR-based access to unlicensed spectrum (NR-U) system, a Universal Mobile Telecommunication System (UMTS), a Wireless Local Area Networks (WLAN), a Wireless Fidelity (Wi-Fi), a 5G system (also called a New Radio (NR) system) or other communication systems.

Generally, traditional communication systems support a limited number of connections and are easy to implement. However, with the development of communication technologies, mobile communication systems not only supports traditional communications, but also supports Device to Device (D2D) communication, machine to machine (M2M) communication, machine type communication (MTC), vehicle to vehicle (V2V) communication, etc. The embodiments of the present application can also be applied to these communication systems.

Figure 1:
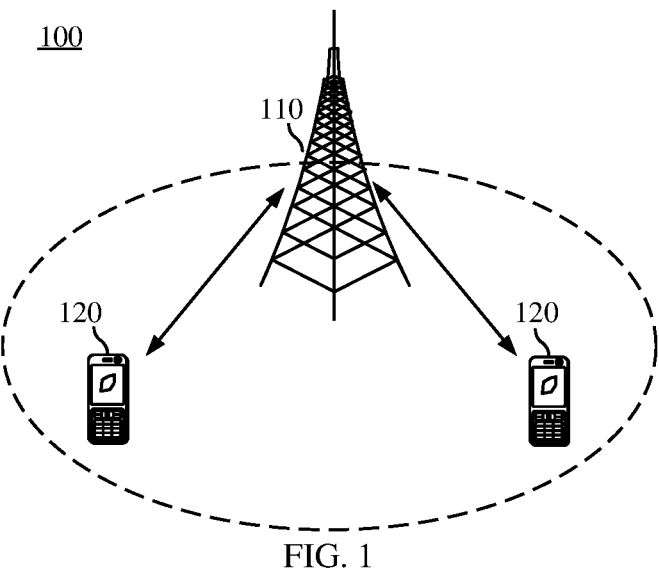
FIG. 1 is a schematic diagram of a possible wireless communication system to which an embodiment of the present application is applied.

Exemplarily, a communication system 100 applied in an embodiment of the present application is shown in FIG. 1. The communication system 100 includes a network device 110 and at least one terminal device 120 located within a coverage area of the network device 110. The network device 110 may provide communication coverage for a specific geographic area, and may communicate with terminal devices located in the coverage area. The terminal device 120 can communicate with the network device 110 through electromagnetic waves.

The network device 110 may be a base station defined by 3GPP, such as a base station (gNB) in a 5G mobile communication system. The network device 110 may also be a non-3GPP access device, such as an access gateway (AG). The network device 110 may also be a relay station, an access point, a vehicle-mounted device, a wearable device, and other types of devices.

The terminal device 120 may include various handheld devices, vehicle-mounted devices, wearable devices, computing devices or other processing devices connected to a wireless modem, which have the wireless communication functions, such as user equipment (UE), a mobile station (MS), a soft terminal, a home gateway, a set-top box, etc., as defined by the 3rd Generation Partnership Project (3GPP).

FIG. 1 exemplarily shows one network device and two terminal devices, but the present application is not limited to this. The communication system 100 may include multiple network devices, and other numbers of terminal devices may be included in the coverage of each network device.

In addition, the communication system 100 may also include other network entities such as a network controller and a mobility management entity.

After a cell search procedure, the terminal device has achieved downlink synchronization with the cell, so the terminal device can receive downlink data. However, the terminal device can only perform uplink transmission if it has achieved uplink synchronization with the cell. The terminal device can establish a connection with the cell and get uplink synchronization through a Random Access Procedure (RAR). That is to say, through the random access, the terminal device can get uplink synchronization and obtain a unique identifier assigned to it by the network device, that is, a Cell Radio Network Temporary Identity (C-RNTI).

The random access procedure may include a 4-step random access procedure and a 2-step random access procedure. Hereinafter, the 4-step random access procedure and the 2-step random access procedure are explained in conjunction with FIG. 2 and FIG. 3, respectively.

The 4-step random access procedure and the 2-step random access procedure can usually be triggered by one of the following six types of trigger events:

(1) Initial access.

The terminal device enters a RRC CONNECTED state from a Radio Resource Control (RRC) idle state (RRC IDLE state).

(2) Handover.

At this time, the terminal device needs to establish uplink synchronization with a new cell.

(3) RRC Connection Re-establishment procedure.

After a Radio Link Failure (RLF) occurs in the terminal device, the wireless connection is re-established.

(4) In the RRC CONNECTED state, when the downlink data arrives, the uplink is in an "out of synchronization" state.

After the downlink data arrives, the terminal device needs to reply with an Acknowledgement (ACK) message or a Negative Acknowledgement (NACK) message.

(5) In the RRC CONNECTED state, the uplink data arrives, the uplink is in the "out of synchronization" state or there is no available physical uplink control channel (PUCCH) resource for transmission of a scheduling request (SR) message.

When uplink data arrives, for example, when it is necessary to report a measurement report or transmit user data, the uplink is in the "out of synchronization" state, or there is no available PUCCH resource for the transmission of the SR message (at this time, terminal device that is already in the uplink synchronization state is allowed to use a Random Access Channel (RACH) in place of the role of SR), then the terminal device can initiate a random access procedure.

(6) In the RRC CONNECTED state, in order to locate the terminal device, it is necessary to obtain a Timing Advance (TA).

In addition, the random access procedure may also be triggered due to other causes such as RRC_INACTIVE state transition, request for other system information (OSI), beam failure recovery, or the like.

In an embodiment of the present application, the first to fourth messages in the 4-step random access procedure are respectively denoted as Msg 1, Msg 2, Msg 3, and Msg 4, and the first message and the second message in the 2-step random access procedure are denoted as Msg A and Msg B, respectively.

Figure 2:
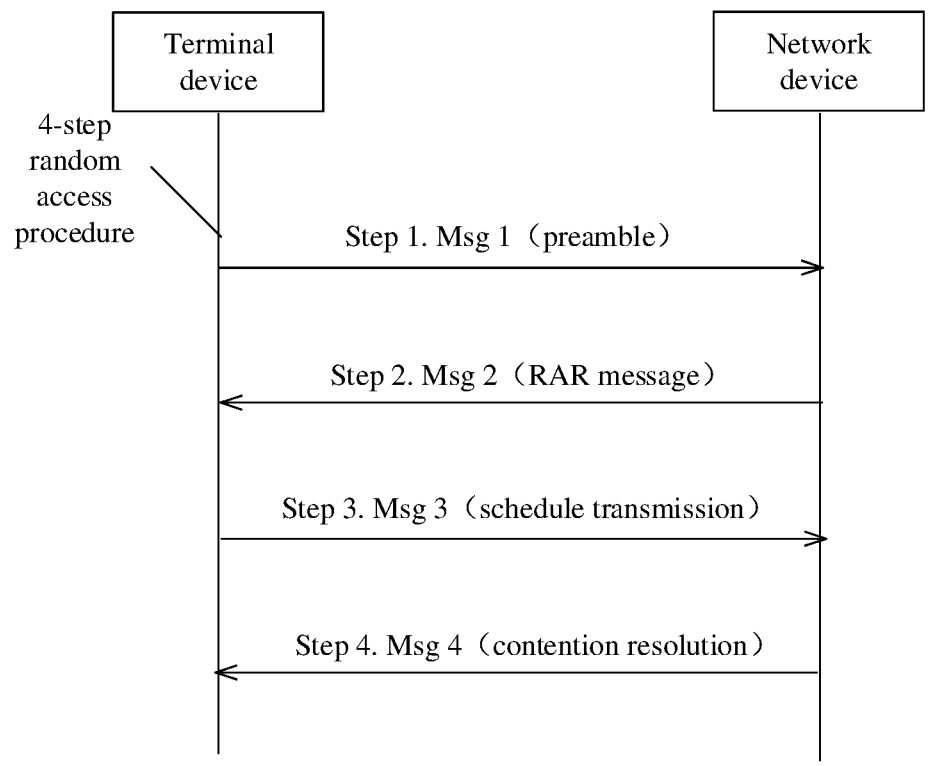
FIG. 2 is a schematic diagram of a 4-step random access procedure.

FIG. 2 is an interaction flow chart of the 4-step random access. As shown in FIG. 2, the 4-step random access procedure can include the following four steps.

In step 1, the terminal device transmits Msg 1 to the network device.

Msg 1 carries a Random Access Preamble (RAP) which is also called a preamble, a random access preamble sequence, a preamble sequence, etc. The preamble is carried on PRACH.

In addition, Msg 1 can also be used for the network device to estimate a transmission delay between the network device and the terminal device and to calibrate the uplink time accordingly.

In step 2, the network device transmits Msg 2 to the terminal device.

When detecting Msg 1 transmitted by the terminal device, the network device transmits Msg 2, i.e., a Random Access Response (RAR) message to the terminal device to inform the terminal device of information about the uplink resources that can be used to transmit Msg 3, assigns a Radio Network Temporary Identity (RNTI) to the terminal device and provides a TA command to the terminal device.

The terminal device monitors a Physical Downlink Control Channel (PDCCH) in a RAR window to receive the RAR message. If the terminal device fails to detect the RAR message in the RAR window, the terminal device can perform PRACH retransmission. If the terminal device successfully detects the RAR message in the RAR window, the terminal device performs Msg 3 transmission according to the uplink resource indicated by the RAR message, that is, performing step 3.

In step 3, the terminal device transmits Msg 3 to the network device.

This step allows Hybrid Automatic Repeat reQuest (HARQ) retransmission.

In step 4, the network device transmits Msg 4 to the terminal device.

Msg 4 includes a contention resolution message. In addition, Msg 4 can allocate uplink transmission resources for the terminal device. This step allows HARQ retransmission.

When the terminal device receives the Msg 4 transmitted by the network device, it will detect whether the Msg 4 includes part of contents of Msg 3 transmitted by it. If so, it indicates that the random access of the terminal device is successful; otherwise, it indicates that the random access of the terminal device fails, and the terminal device needs to initiate the random access procedure again from the step 1.

There is a large latency in the 4-step random access procedure, and thus in the NR, the terminal device can also initiate the 2-step random access procedure to adapt to low-latency and high-reliability services and reduce the latency of the random access.

Simply put, in the 2-step random access procedure, Msg 1 and Msg 3 in the 4-step random access procedure can be combined into Msg A in the 2-step random access procedure, and Msg 2 and Msg 4 in the 4-step random access procedure can be combined into Msg B in the 2-step random access procedure.

Figure 3:
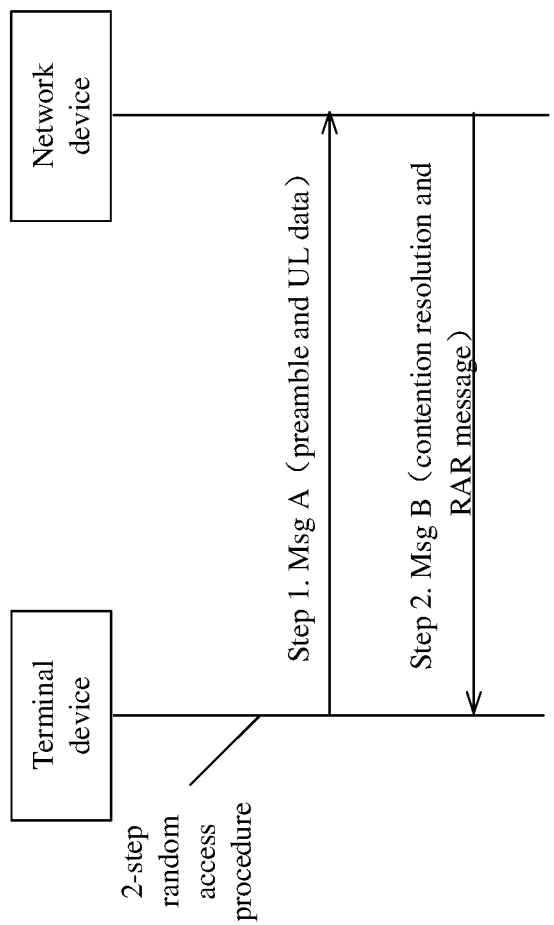
FIG. 3 is a schematic diagram of a 2-step random access procedure.

FIG. 3 is an interaction flow chart of a 2-step random access. As shown in FIG. 3, the 2-step random access procedure can include the following two steps.

In step 1, the terminal device transmits Msg A to the network device.

That is, the preamble and additional information are transmitted. Msg A can include the preamble and uplink data. The preamble is carried on PRACH. The uplink data is carried on an uplink channel, which may be a PUSCH, for example. The uplink data carries identity information of the terminal device, a cause for the RRC request, etc. In other words, Msg A may include part or all of the information in Msg 1 and Msg 3 in the 4-step random access procedure.

The network device can configure periodic resources that can be used to transmit Msg A in the 2-step random access procedure, namely a PRACH occasion and a PUSCH occasion.

In step 2, the network device transmits Msg B to the terminal device.

That is, RAR and conflict resolution. Msg B includes conflict resolution information, C-RNTI allocation information, TA information, and so on. In other words, Msg B may include part or all of the information in Msg 2 and Msg 4 in the 4-step random access procedure.

It should be understood that FIG. 2 and FIG. 3 are only examples. Msg A may include part or all of the information carried in Msg 1 and Msg 3, or may also include other information. Msg B may include part or all of the information carried in Msg 2 and Msg 4, or may also include other information.

Since the 2-step random access procedure has not yet come into the standardization stage, FIG. 3 is used only as an example for introduction. There are other possibilities for the definition of the random access messages involved, and there is no limitation on other definitions of the random access messages in the 2-step random access procedure. The method described in the embodiments of the present application is applicable to all other 2-step random access procedures.

There are flexible indicating manners of a slot format in the NR, and the network device can indicate the slot format to the terminal device through different indicating manners. Hereinafter, the indicating manners of the slot format in the NR will be described in conjunction with FIG. 4 to FIG. 6.

A flexible uplink and downlink slot format is supported in NR, and each slot can be configured as three types (or directions): downlink (DL), uplink (UL), and flexible. The DL slot is used to transmit a downlink channel or downlink signal; the UL slot is used to transmit an uplink channel or uplink signal; and the flexible slot can be used to transmit the uplink channel or uplink signal, and can also be used to transmit the downlink channel or downlink signal. Symbols in each slot can also be configured into three types: DL, UL, and flexible. The flexible slot can be scheduled to be the DL slot or the UL slot. The flexible symbol can be scheduled to become the DL symbol or the UL symbol.

Figure 4:
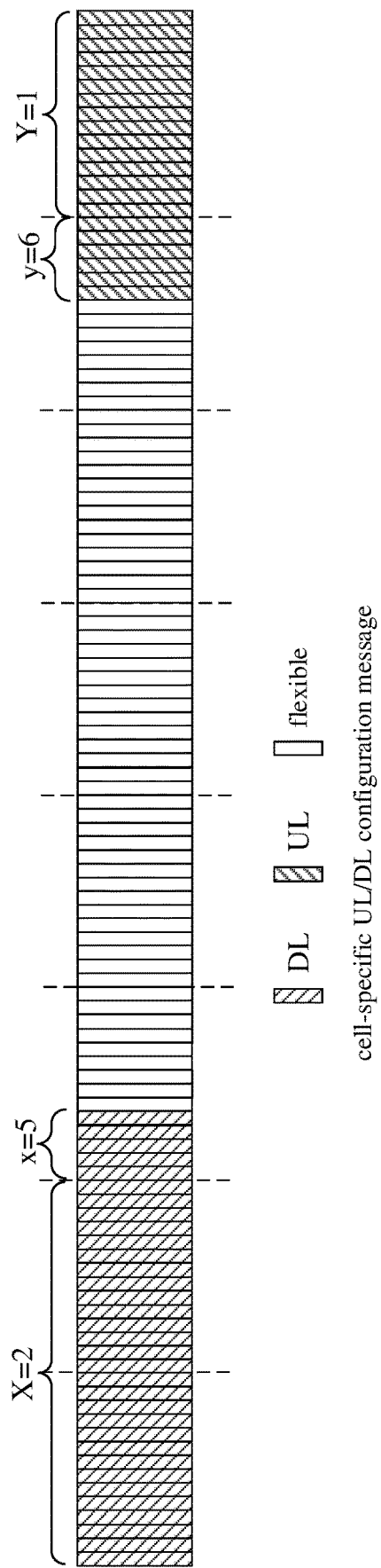
FIG. 4 to FIG. 6 are schematic diagrams of frame format indication manners according to embodiments of the present application.

The network device can transmit a cell-specific UL/DL configuration message (cell-specific UL/DL configuration) through a broadcast message. The configuration message is used to configure the slot format within a period, for example, within 10 ms. The terminal device can determine the slot format in the period according to the cell-specific UL/DL configuration. As shown in FIG. 4, it is assumed that a number of X slots in the period are DL slots, first x symbols in the X+1th slot are DL symbols, the last Y symbols in the period are UL symbols, the last y symbols in the (Y+1)th slot from the end are UL symbols, and the rest of the symbols in this period are flexible symbols.

Figure 5:
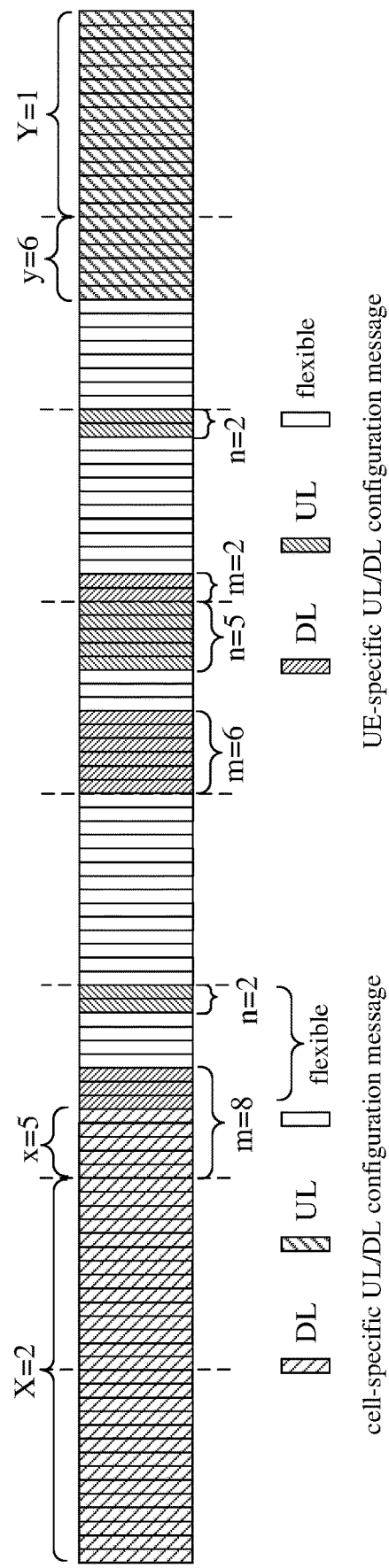

Further, the network device may also transmit a UE-specific UL/DL configuration message (UE-specific UL/DL configuration) through RRC dedicated signaling. The configuration message is used to configure the slot format of a specified slot within a period, i.e., a configuration period of the cell-specific UL/DL configuration, and it can only change the direction of the symbols configured as flexible by the Cell-specific UL/DL configuration, and cannot change the direction of the symbols configured as DL or UL by the Cell-specific UL/DL configuration. As shown in FIG. 5, m is the number of the DL symbols in the slot, n is the number of the UL symbols in the slot, and the remaining symbols are still flexible symbols.

Furthermore, the network device can also indicate the slot format through downlink control information (DCI). The DCI carries a slot format indicator (SFI) message, and the SFI message is used to configure the slot format. The configuration period of the SFI may be different from the configuration period of the Cell-specific UL/DL configuration.

Figure 6:
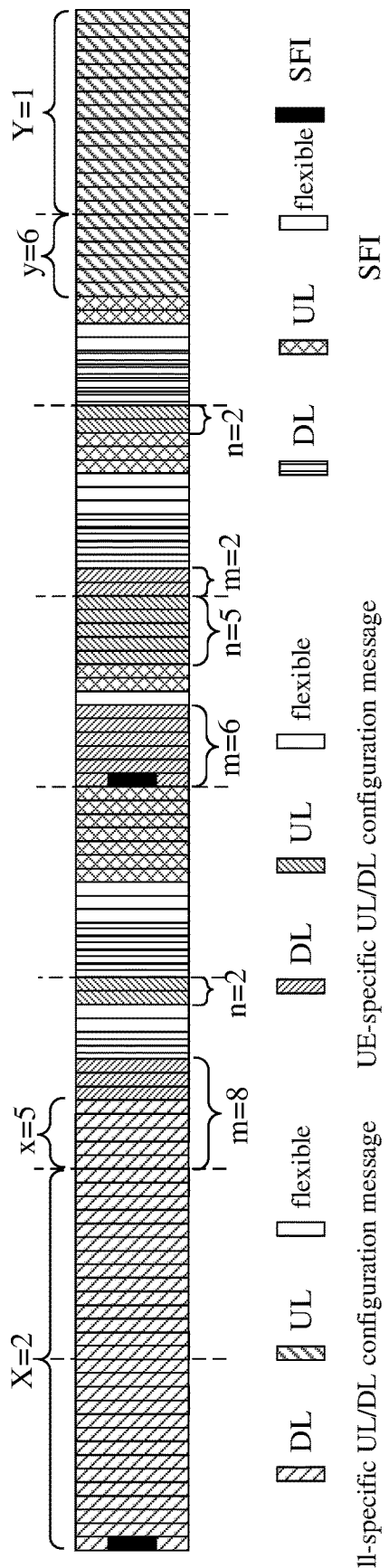

In addition, the SFI can only change the direction of the symbols configured as flexible by the cell-specific UL/DL configuration and the UE-specific UL/DL configuration, but cannot change the direction of the symbols that have already been configured as DL or UL symbols. As shown in FIG. 6, the SFI is used to indicate the slot format of K slots.

The terminal device needs to determine the transmission location of the uplink and downlink data based on the above manners, and the data transmission needs to follow preset rules. For the PRACH and PUSCH in the Msg A of the 2-step random access procedure, the transmission thereof also needs to follow these rules. These rules can avoid problems such as resource conflicts, but they may also restrict the transmission of the PRACH or PUSCH in the Msg A of the 2-step random access procedure. Since there is a certain association between the PRACH and the PUSCH, the PRACH and PUSCH transmission may affect each other, and PRACH and PUSCH may also affect the downlink channel transmission.

To this end, a random access method is proposed in an embodiment of the present application, which can realize effective transmission of Msg A in the 2-step random access procedure.

Figure 7:
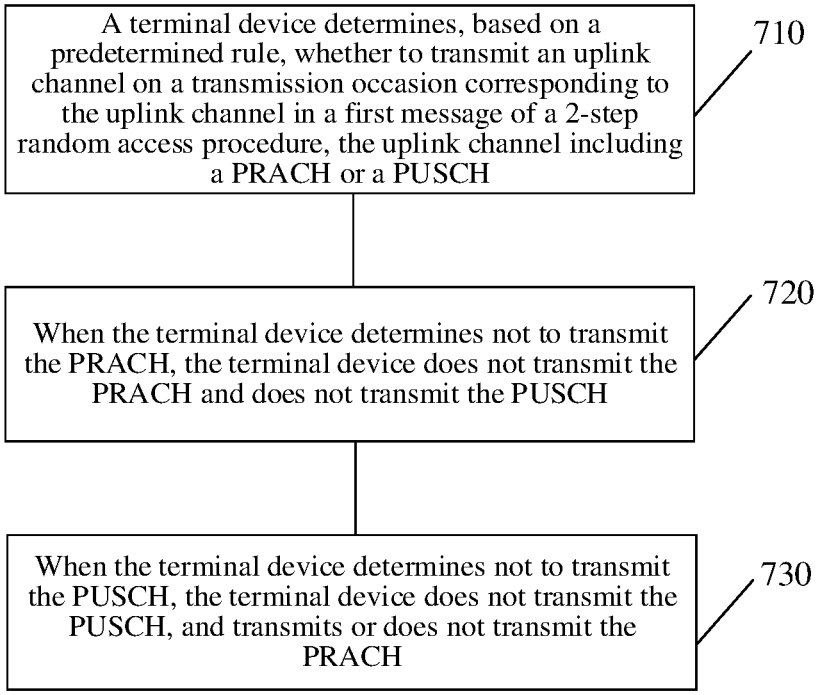
FIG. 7 is a schematic flowchart of a random access method according to an embodiment of the present application.

FIG. 7 is a schematic flowchart of a random access method according to an embodiment of the present application. The method shown in FIG. 7 can be performed by a terminal device. The terminal device may be, for example, the terminal device 120 shown in FIG. 1. As shown in FIG. 7, the method includes some or all of the following steps.

In 710, the terminal device determines, based on a predetermined rule, whether to transmit an uplink channel on a transmission occasion corresponding to the uplink channel in a first message of a 2-step random access procedure.

The uplink channel includes, for example, a PRACH or a PUSCH.

The transmission occasion corresponding to the PRACH is a PRACH occasion, and the transmission occasion corresponding to the PUSCH is a PUSCH occasion.

In 720, if the terminal device determines not to transmit the PRACH, the terminal device does not transmit the PRACH and does not transmit the PUSCH.

In 730, if the terminal device determines not to transmit the PUSCH, the terminal device does not transmit the PUSCH, and transmits or does not transmit the PRACH.

When the terminal device performs uplink and downlink transmission based on the slot format indicated in the foregoing manners, it needs to follow the preset rule. The preset rule can be used, for example, to avoid conflicts between the uplink transmission and the downlink transmission, and conflicts between the uplink signal and the uplink channel, and to regulate the channel monitoring behavior of the terminal device. In 710, if the terminal device determines, based on the preset rule, not to transmit the uplink channel, such as the PRACH and/or the PUSCH, on the transmission occasion corresponding to the uplink channel in the first message of the 2-step random access procedure, the terminal device may determine whether to transmit the PRACH and the PUSCH according to 720 and 730.

In 720, if the terminal device does not transmit the PRACH, it does not transmit the corresponding PUSCH, either. In 730, if the terminal device does not transmit the PUSCH, the terminal device can choose either not to transmit the PRACH or to transmit the PRACH.

A complete Msg A includes two parts: a PRACH and a PUSCH. Generally, the network device knows that there is a PUSCH only after detecting the preamble carried in the PRACH transmitted by the terminal device, and thus detects the corresponding PUSCH. The network device needs to estimate the relevant channel information based on the detection of the PRACH, and use the channel information to assist in demodulation of the PUSCH. If the network device detects the PRACH but not the PUSCH, it can only respond to the PRACH. At this time, Msg A can be used as Msg 1.

Therefore, when the terminal device determines not to transmit the PRACH, it does not transmit the PUSCH; and when the terminal device determines not to transmit the PUSCH, it can choose to transmit or not to transmit the PRACH.

Optionally, if the terminal device does not transmit the PUSCH, but transmits the PRACH corresponding to the same Msg A, the 2-step random access procedure may fall back to the 4-step random access procedure.

That is to say, if the terminal device cannot transmit the PRACH, the PUSCH cannot be transmitted; however, if the terminal device cannot transmit the PUSCH, the PRACH may be or may not be transmitted. Moreover, when the network device receives only the PRACH, it can fall back from the 2-step random access procedure to the 4-step random access procedure, so as to make full use of the PRACH transmitted by the terminal device.

In 710, the preset rule may include at least one of the following, for example:

(1) On a TDD single carrier, if the transmission occasion overlap with any symbol from a set of symbols used for transmitting a synchronizing signal block (Synchronizing Signal/PBCH Block, SSB or SS/PBCH Block), the terminal device determines not to transmit the uplink channel on the set of symbols;

(2) For a set of symbols in the transmission occasion that are indicated as flexible symbols by an uplink-downlink-configuration-common message (tdd-UL-DL-ConfigurationCommon) and an uplink-downlink-configuration-dedicated message (tdd-UL-DL-ConfigurationDedicated) and are indicated as flexible symbols by a first DCI carrying the slot format information, if the terminal device fails to detect a second DCI scheduling the terminal device to transmit the uplink channel, the terminal device determines not to transmit the uplink channel on the set of symbols;

(3) On a TDD single carrier, for a set of symbols in the transmission occasion that are configured by a higher layer to transmit the uplink channel, if the terminal device detects the second DCI indicating to the terminal device to receive a downlink channel in a subset of symbols from the set of symbols, the terminal device determines not to transmit the uplink channel after a time length T from a last symbol of a control resource set where the second DCI is detected;

(4) For a set of symbols in the transmission occasion that are configured by the higher layer to transmit the uplink channel, if the terminal device detects the first DCI carrying the slot format information that is used to indicate a subset of symbols from the set of symbols as flexible symbols or downlink symbols, or detects the second DCI indicating to the terminal device to receive the downlink channel in the subset of symbols, the terminal device determines not to transmit the uplink channel after a time length T from a last symbol of a control resource set where the first DCI and/or the second DCI is detected;

(5) For a set of symbols in the transmission occasion that are configured by the higher layer to transmit the uplink channel, if the symbols from the set of symbols are indicated as flexible symbols by the uplink-downlink-configuration-common message (tdd-UL-DL-ConfigurationCommon) and the uplink-downlink-configuration-dedicated message (tdd-UL-DL-ConfigurationDedicated), or if the uplink-downlink-configuration-common message (tdd-UL-DL-ConfigurationCommon) and the uplink-downlink-configuration-dedicated message (tdd-UL-DL-ConfigurationDedicated) are not provided to the terminal device and the terminal device does not detect the first DCI carrying the slot format information, the terminal device determines not to transmit the uplink channel after M symbols from a last symbol of a control resource set used to detect the first DC.

In 710, if the terminal device determines not to transmit the uplink signal in the corresponding transmission occasion based on the preset rules described in (1) to (5) above, for example, determines not to transmit the PRACH on the PRACH occasion, or not to transmit the PUSCH on the PUSCH occasion, the terminal device performs 720 or 730.

For rules (3) to (5), the time length T and the M symbols are time for channel processing. The time for channel processing can be understood as the time for processing the DCI by the terminal device. Taking rule (3) as an example, the time length T is required for the terminal device to perform decoding and other processing on the DCI. If the terminal device does not complete the decoding of the DCI, it will not know that the DCI schedules the downlink transmission. Therefore, the terminal device can still transmit the uplink channel within the time length T, but after the time length T, the terminal device will not transmit the uplink channel on the corresponding transmission occasion.

For simplicity, the time length T and the M symbols are preset as the PUSCH processing time herein, and the PUSCH processing time corresponds to the processing capability of the terminal device.

Figure 8:
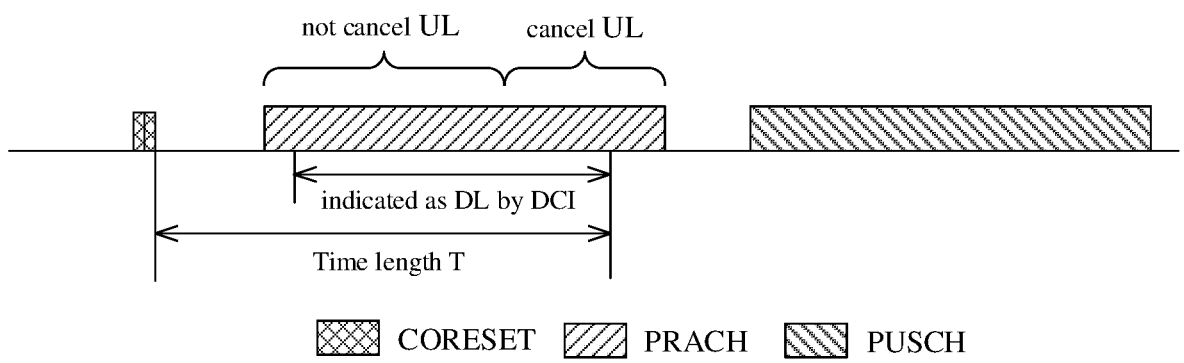
FIG. 8 is a schematic diagram of PRACH and PUSCH transmission in an embodiment of the present application.

For example, as shown in FIG. 8, the terminal device prepares to transmit PRACH and PUSCH in a set of symbols configured by the higher layer for transmission of the uplink channel shown in FIG. 8. If the terminal device receives the second DCI in a Control Resource Set (CORESET), and the second DCI instructs the terminal device to receive a downlink channel in a subset of symbols from the set of symbols, the terminal device does not cancel the prepared PRACH transmission on symbols from the subset of symbols that are located within the time length T relative to a last symbol of the CORESET which is used as a reference point, and will cancel the PRACH transmission on the symbols from the subset of symbols that are located after the time length T. If the PRACH transmission is cancelled, the PUSCH will not be transmitted.

It should be understood that the first DCI in the embodiments of the present application carries the slot format information, for example, a SFI-index field. A value of the SFI-index field can be used to indicate the slot format, including flexible, UL, and DL. The format of the first DCI may be DCI format 2_0, DCI format 2_X, or the like.

The second DCI in the embodiments of the present application may also be referred to as scheduling information, including UL scheduling information and DL scheduling information, which are respectively used to instruct the terminal device to transmit uplink data or receive downlink data on corresponding symbols or slots. The format of the second DCI may be DCI format 0_1, DCI format 1_0, DCI format 1_1, DCI format 2_3, DCI format 2_X, RAR uplink grant message (RAR UL grant), or the like.

The rules (1) to (5) described above may all cause the cancellation of the PRACH and/or PUSCH, or in other word, cause the PRACH and/or PUSCH not to be transmitted.

In addition, the preset rule may also include other rules. The rules that the terminal device needs to follow in transmitting the PRACH and PUSCH in Msg A are listed below in more detail.

Rule 0

For symbols indicated as DL by tdd-UL-DL-ConfigurationCommon or tdd-UL-DL-ConfigurationDedicated, the terminal device does not transmit PUSCH, PUCCH, PRACH in Msg 1, PRACH in Msg A, PUSCH in Msg A, and SRS on these symbols.

Rule 1

For the terminal device working on a Time Division Duplex (TDD) single carrier, for a set of symbols where the terminal device receives SSB, if any symbol from PUSCH, PUCCH, PRACH of Msg 1, PRACH of Msg A, or PUSCH of Msg A overlaps the set of symbols, the terminal device does not transmit the PUSCH, PUCCH, PRACH of Msg 1, PRACH of Msg A, or PUSCH of Msg A on the set of symbols, and the terminal device does not transmit a Sounding Reference Signal (SRS) on the set of symbols.

If the terminal device does not transmit the PRACH of Msg A due to the above reasons, the terminal device does not transmit the PUSCH corresponding to the same Msg A; and if the terminal device does not transmit the PUSCH of Msg A due to the above reasons, the terminal device can transmit or not transmit the PRACH corresponding to the same Msg A.

Rule 2

In a PRACH occasion corresponding to a valid Msg 1, a PRACH occasion corresponding to a valid Msg A or a PUSCH occasion corresponding to a valid Msg A, and in a set of $N_{gap}$ symbols before the PRACH occasion corresponding to the valid Msg 1, the PRACH occasion corresponding to the valid Msg A or the PUSCH occasion corresponding to the valid Msg A, the terminal device does not receive a PDCCH (Type 1-Common Search Space (CSS) set (Type 1-PDCCH CCS set)), a PDSCH or a Channel State Information-Reference Signal (CSI-RS) that overlaps the set of symbols.

The terminal device does not expect the set of symbols to be indicated as DL by tdd-UL-DL-ConfigurationCommon or tdd-UL-DL-ConfigurationDedicated.

It should be understood that "the terminal device does not expect . . . " in the embodiments of the present application can be understood as that the terminal device does not detect . . . , does not receive . . . , or discards after receiving . . . . Correspondingly, as for the network device, "the terminal device does not expect . . . " can be understood as that the network device does not transmit . . . .

Rule 3

In rule 3.1, in a set of symbols indicated as DL by DCI format 2_0, the terminal device does not expect to be scheduled to transmit PUSCH, PUCCH, PRACH of Msg 1, PRACH of Msg A, PUSCH of Msg A, or SRS in the set of symbols.

In rule 3.2, in a set of symbol configured for transmission of the PRACH of Msg 1, the PRACH of Msg A, or the PUSCH of Msg A, the terminal device does not expect to receive the DCI format 2_0 indicating the set of symbols as DL.

Rule 4

For a set of symbols indicated as flexible by tdd-UL-DL-ConfigurationCommon and tdd-UL-DL-ConfigurationDedicated, or when tdd-UL-DL-ConfigurationCommon and tdd-UL-DL-ConfigurationDedicated are not provided, if the terminal device detects the DCI format 2_0, for the set of symbols indicated as flexible by the DCI format 2_0, the terminal device may be scheduled to transmit PUSCH, PUCCH, PRACH of Msg 1, PRACH of Msg A, PUSCH of Msg A or SRS in the set of symbols;

for the set of symbols indicated as flexible by the DCI format 2_0, if the terminal device does not receive DL scheduling information and does not receive UL scheduling information, the terminal device does not perform reception or transmission on the set of symbols;

in the set of symbols that are configured by the higher layer for transmission of PUCCH, PUSCH, PRACH of Msg 1, PRACH of Msg A, or PUSCH of Msg A and are indicated as UL by the DCI format 2_0, the terminal device transmits PUCCH, PUSCH, PRACH of Msg 1, PRACH of Msg A or PUSCH of Msg A; and if the terminal device does not transmit the PRACH of Msg A due to the above reasons, the terminal device does not transmit the PUSCH corresponding to the same Msg A; and if the terminal device does not transmit the PUSCH of Msg A due to the above reasons, the terminal device can transmit or not transmit the PRACH corresponding to the same Msg A.

Rule 5

In a set of symbols configured by the higher layer to receive CSI-RS or PDSCH, if a subset of symbols from the set of symbols are indicated as UL or flexible by DCI format 2_0, or at least one symbol from the set of symbols is scheduled to transmit PUCCH, PUSCH, PRACH of Msg 1, PRACH of Msg A, PUSCH of Msg A or SRS, the terminal device cancels the reception of CSI-RS or PDSCH.

Rule 6

For a set of symbols indicated as flexible by tdd-UL-DL-ConfigurationCommon or tdd-UL-DL-ConfigurationDedicated, or when tdd-UL-DL-ConfigurationCommon and tdd-UL-DL-ConfigurationDedicated are not provided, if the terminal device is not configured to monitor the PDCCH carrying the DCI format 2_0, the terminal device may be scheduled to transmit PUSCH, PUCCH, PRACH in Msg 1, PRACH in Msg A, PUSCH in Msg A, or SRS in the set of symbols.

Rule 7

In a TDD single-carrier scenario, for a set of symbols configured by the higher layer for transmission of PUSCH, PUCCH, PRACH of Msg 1, PRACH of Msg A, PUSCH of Msg A, or SRS, if the terminal device detects the scheduling information indicating to the terminal device to receive CSI-RS or PDSCH in a subset of symbols from the set of symbols, on symbols from the subset of symbols within the time length T relative to a last symbol of a CORESET where the scheduling information is detected, which is used as the reference point, the terminal device does not expect to cancel the transmission of PUSCH, PUCCH, PRACH of Msg 1, PRACH of Msg A, or PUSCH of Msg A configured by the higher layer. The terminal device cancels transmission of PUSCH, PUCCH, PRACH of Msg 1, PRACH of Msg A, or PUSCH of Msg A in remaining symbols of the set of symbols, and cancels transmission of SRS in the remaining symbols of the subset of symbols.

If the terminal device does not transmit the PRACH of Msg A, the terminal device does not transmit the PUSCH corresponding to the same Msg A, regardless of whether the transmission of PUSCH is located in the remaining symbols of the subset of symbols or not; and if the terminal device does not transmit the PUSCH of Msg A, the terminal device may transmit or may not transmit the PRACH corresponding to the same Msg A.

For the set of symbols configured by the higher layer for transmission of PUSCH, PUCCH, PRACH of Msg 1, PRACH of Msg A, PUSCH of Msg A, or SRS, if the terminal device detects the DCI format 2_0 and the DCI format 2_0 indicates a subset of symbols from the set of symbols as DL or flexible, or if the terminal device detects the scheduling information indicating to the terminal device to receive CSI-RS or PDSCH in the subset of symbols from the set of symbols, on symbols from the subset of symbols within the time length T relative to a last symbol of a CORESET where the DCI format 2_0 or the scheduling information is detected, which is used as the reference point, the terminal device does not expect to cancel the transmission of the PUSCH, PUCCH, PRACH of Msg 1, PRACH of Msg A, PUSCH of Msg A, or SRS configured by the higher layer. The terminal device cancels transmission of PUSCH, PUCCH, PRACH of Msg 1, PRACH of Msg A, or PUSCH of Msg A in the remaining symbols of the set of symbols, and cancels transmission of SRS in the remaining symbols of the subset of symbols.

If the terminal device does not transmit the PRACH of Msg A, the terminal device does not transmit the PUSCH corresponding to the same Msg A, regardless of whether the transmission of PUSCH is located in the remaining symbols of the subset of symbols or not; and if the terminal device does not transmit the PUSCH of Msg A, the terminal device may transmit or may not transmit the PRACH corresponding to the same Msg A.

Rule 8

In the TDD single carrier scenario, for flexible symbols in the CORESET in which the terminal device monitors the PDCCH, if the terminal device does not detect the DCI format 2_0 indicating the flexible symbols as flexible or UL, and the terminal device does not detect the scheduling information indicating to the terminal device to transmit PUSCH, PUCCH, PRACH of Msg 1, PRACH of Msg A, PUSCH of Msg A or SRS on the flexible symbols, the terminal device assumes that the flexible symbols are UL symbols.

In the TDD single carrier scenario, the terminal device is configured by the higher layer to receive PDCCH, PDSCH or CSI-RS in a set of symbols, and if the terminal device does not receive the scheduling information indicating to the terminal device to transmit PUSCH, PUCCH, PRACH of Msg 1, PRACH of Msg A, PUSCH of Msg A or SRS on at least one symbol from the set of symbols, the terminal device receives the PDCCH, PDSCH or CSI-RS in the set of symbols; otherwise, the terminal device does not receive the PDCCH, PDSCH or CSI-RS in the set of symbols.

Rule 9

In a set of symbols indicated as flexible by tdd-UL-DL-ConfigurationCommon and tdd-UL-DL-ConfigurationDedicated, or when tdd-UL-DL-ConfigurationCommon and tdd-UL-DL-ConfigurationDedicated are not provided, if the terminal device does not detect the DCI format 2_0, if the terminal device is scheduled to transmit PUSCH, PUCCH, PRACH of Msg 1, PRACH of Msg A, PUSCH of Msg A or SRS in the set of symbols, the terminal device transmits PUSCH, PUCCH, PRACH of Msg 1, PRACH of Msg A, PUSCH of Msg A or SRS;

if the terminal device is configured by the higher layer to transmit PUSCH, PUCCH, PRACH of Msg 1, PRACH of Msg A, PUSCH of Msg A or SRS in the set of symbols, in a slot where symbols after M symbols from the set of symbols, relative to a last symbol of a CORESE configured for monitoring PDCCH carrying the DCI format 2_0 which is used as the reference point, are located, the terminal device does not transmit PUSCH, PUCCH, PRACH of Msg 1, PRACH of Msg A, or PUSCH of Msg A, and in the symbols after the M symbols from the set of symbols, the terminal device does not transmit SRS. The terminal device does not expect to cancel the transmission of PUSCH, PUCCH, PRACH of Msg 1, PRACH of Msg A, PUSCH of Msg A, or SRS in symbols before the M symbols from the set of symbols.

If the terminal device does not transmit the PRACH of Msg A, the terminal device does not transmit the PUSCH corresponding to the same Msg A; and if the terminal device does not transmit the PUSCH of Msg A, the terminal device can transmit or not transmit the PRACH corresponding to the same Msg A.

The method in the embodiments of the present application can be applied to various random access procedures, not just the initial access procedure.

In addition, the method in the embodiments of the present application can be applied to a contention based RACH and a contention free RACH.

It should be noted that, under the premise of no conflict, the various embodiments and/or the technical features in various embodiment described in the present application can be combined with each other arbitrarily, and the technical solutions obtained from the combination should also fall within the protection scope of the present application.

In the embodiments of the present application, the sequence numbers of the processes do not mean the performing order, and the performing order of the processes should be determined according to the functions and the internal logic thereof, and should not limit the implementations of the embodiments of the present application.

The random access method according to the embodiments of the present application has been described in detail above. A device for random access according to an embodiment of the present application will be described below in conjunction with FIG. 9. The technical features described in the method embodiments are applicable to the following device embodiments.

It can be understood that, in order to realize the above-mentioned functions, the device includes hardware structures and/or software modules for performing corresponding functions. Those skilled in the art should easily realize that in combination with the units and algorithm steps of the examples described in the embodiments disclosed herein, the present application can be implemented in the form of hardware or a combination of hardware and computer software. Whether a certain function is executed by hardware or computer software-driven hardware depends on the specific application and design constraint conditions of the technical solution. Professionals and technicians can use different methods for each specific application to implement the described functions, and such implementation should not be considered as going beyond the scope of the present application.

In the present application, the device can be divided into functional units according to the aforementioned method. For example, it can be divided into units according to the functions, or two or more functions can be integrated into one unit. The above integrated unit can be implemented in the form of hardware or in the form of software functional unit. It should be noted that the division of units in the present application is illustrative, and is only a logical function division, and there may be other division methods in actual implementations.

Figure 9:
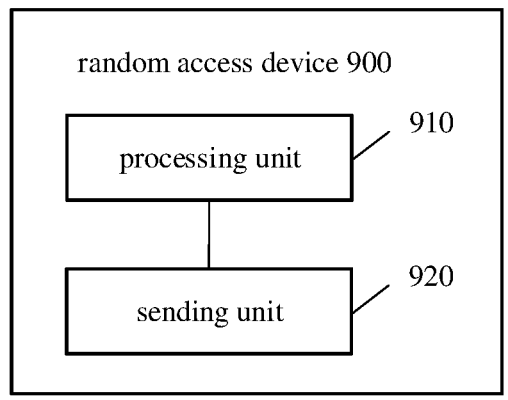
FIG. 9 is a schematic block diagram of a random access device according to an embodiment of the present application.

FIG. 9 is a schematic block diagram of a device 900 for random access according to an embodiment of the present application. As shown in FIG. 9, the device 900 includes a processing unit 910 and a transmitting unit 920.

The processing unit 910 is configured to determine, based on a predetermined rule, whether to transmit an uplink channel on a transmission occasion corresponding to the uplink channel in a first message of a 2-step random access procedure, where the uplink channel includes a physical random access channel (PRACH) and a physical uplink shared channel (PUSCH).

The transmitting unit 920 is configured to not transmit the PRACH and not transmit the PUSCH when the processing unit determines not to transmit the PRACH; and not transmit the PUSCH and transmit or not transmit the PRACH when the processing unit determines not to transmit the PUSCH.

Therefore, in the 2-step random access procedure, when the device determines not to transmit the PRACH in Msg A based on the preset rule, it will not transmit the PUSCH in Msg A; and when it determines not to transmit the PUSCH in Msg A, it can either transmit or not transmit the PRACH in Msg A, thereby ensuring the effective transmission of the PRACH and the PUSCH.

Optionally, the processing unit 910 is further configured to: when the transmitting unit does not transmit the PUSCH and transmits the PRACH, determine to fall back from the 2-step random access procedure to a 4-step random access procedure.

Optionally, the processing unit 910 is specifically configured to, if the transmission occasion overlaps any symbol from the set of symbols on a single carrier of time division duplex (TDD), determine not to transmit the uplink channel on a set of symbols used for transmission of a synchronization signal block.

Optionally, the processing unit 910 is specifically configured to, if the terminal device does not detect a second DCI that schedules the terminal device to transmit the uplink channel, determined not to transmit the uplink channel on a set of symbols in the transmission occasion that are indicated as flexible symbols by an uplink-downlink-configuration-common message and an uplink-downlink-configuration-dedicated message and are indicated as flexible symbols by a first downlink control information (DCI) carrying slot format information.

Optionally, the processing unit 910 is specifically configured to: on a single carrier of TDD, for a set of symbols in the transmission occasion that are configured by a higher layer for transmission of the uplink channel, if the terminal device detects a second DCI indicating to the terminal device to receive a downlink channel in a subset of symbols from the set of symbols, determine not to transmit the uplink channel after a time length T from a last symbol of a control resource set where the second DCI is detected, where the time length T is time for channel processing.

Optionally, the processing unit 910 is specifically configured to: for a set of symbols in the transmission occasion that are configured by a higher layer for transmission of the uplink channel, if the terminal device detects a first DCI carrying slot format information that indicates a subset of symbols from the set of symbols as flexible symbols or downlink symbols, or detects a second DCI indicating to the terminal device to receive a downlink channel in the subset of symbols, determine not to transmit the uplink channel after a time length T from a last symbol of a control resource set where the first DCI and/or the second DCI is detected, where the time length T is time for channel processing.

Optionally, the processing unit 910 is specifically configured to: for a set of symbols in the transmission occasion that are configured by a higher layer for transmission of the uplink channel, if symbols from the set of symbols are indicated as flexible symbols by an uplink-downlink-configuration-common message and an uplink-downlink-configuration-dedicated message, or the uplink-downlink-configuration-common message and the uplink-downlink-configuration-dedicated message are not provided to the terminal device and the terminal device does not detect a first DCI carrying slot format information, determine not to transmit the uplink channel after M symbols from a last symbol of a control resource set used for detecting the first DCI, where the M symbols are time for channel processing.

For the specific manner in which the device 900 performs random access and the beneficial effects produced therefrom, reference can be made to the related description in the method embodiments.

Figure 10:
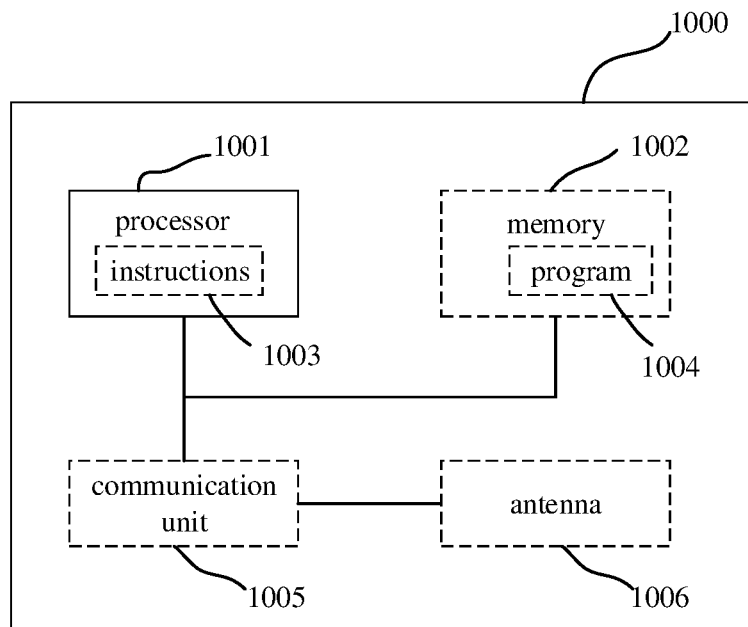
FIG. 10 is a schematic structural diagram of a random access apparatus according to an embodiment of the present application.

FIG. 10 is a schematic structural diagram of a random access device provided by the present application. The dotted lines in FIG. 10 indicate that the units or the modules are optional. The device 1000 may be used to implement the methods described in the foregoing method embodiments. The device 1000 may be a terminal device or a network device or a chip.

The device 1000 includes one or more processors 1001, and the one or more processors 1001 can support the device 1000 to implement the methods in the method embodiments corresponding to FIGS. 2 to 8. The processor 1001 may be a general-purpose processor or a dedicated processor. For example, the processor 1001 may be a central processing unit (CPU). The CPU can be used to control the device 1000, execute a software program, and process data of the software program. The device 1000 may further include a communication unit 1005 to implement signal input (reception) and output (transmission).

For example, the device 1000 may be a chip, and the communication unit 1005 may be an input and/or output circuit of the chip, or the communication unit 1005 may be a communication interface of the chip, and the chip may be used as a component of a terminal device, a network device or other wireless communication devices.

For another example, the device 1000 may be a terminal device or a network device, and the communication unit 1005 may be a transceiver of the terminal device or the network device, or the communication unit 1005 may be a transceiving circuit of the terminal device or the network device.

The device 1000 may include one or more memories 1002 having a program 1004 stored thereon. The program 1004 can be run by the processor 1001 to generate instructions 1003 so that the processor 1001 performs the methods described in the foregoing method embodiments according to the instructions 1003. Optionally, the memory 1002 may also store data. Optionally, the processor 1001 may also read the data stored in the memory 1002. The data may be stored at the same storage address as the program 1004, or the data may be stored at a different storage address from the program 1004.

The processor 1001 and the memory 1002 may be provided separately or integrated together, for example, integrated on a system on chip (SOC) of a terminal device.

The device 1000 may also include an antenna 1006. The communication unit 1005 is used to implement the transceiving function of the device 1000 through the antenna 1006.

For the specific manner in which the processor 1001 performs the communication method, reference may be made to the related description in the method embodiments.

It should be understood that the steps of the foregoing method embodiments may be completed by a logic circuit in the form of hardware or instructions in the form of software in the processor 1001. The processor 1001 may be a CPU, a digital signal processor (DSP), an application specific integrated circuit (ASIC), a field programmable gate array (FPGA), or other programmable logic devices, such as a discrete gate, a transistor logic device, or a discrete hardware component.

The present application also provides a computer program product which, when being executed by the processor 1001, implements the method described in any method embodiment in the present application.

The computer program product may be stored in the memory 1002, which is, for example, the program 1004. The program 1004 is finally converted into an executable object file that can be executed by the processor 1001 through processes such as preprocessing, compilation, assembly, and linking.

The present application also provides a computer-readable storage medium on which a computer program is stored, and the computer program, when being executed by a computer, implements the method described in any method embodiment in the present application. The computer program can be a high-level language program or an executable target program.

The computer-readable storage medium is, for example, the memory 1002. The memory 1002 may be a volatile memory or a non-volatile memory, or the memory 1002 may include both the volatile memory and the non-volatile memory. The non-volatile memory can be a read-only memory (ROM), a Programmable ROM (PROM), an Erasable PROM (EPROM), and electrically available Erase programmable read-only an Electrically EPROM (EEPROM) or a flash memory. The volatile memory may be a random access memory (RAM), which is used as an external cache. By way of exemplary but not restrictive description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM).

Those skilled in the art can clearly understand that, for the convenience and conciseness of description, for the specific working process and technical effects of the device and apparatus described above, reference can be made to the corresponding process and technical effects in the foregoing method embodiments, which will not be repeated here In the embodiments of the present application, the disclosed system, device, and method may be implemented in other ways. For example, some features of the method embodiments described above may be ignored or not implemented.

The device embodiments described above are merely illustrative, and the division of units is only a logical function division. In actual implementations, there may be other division methods, and multiple units or components may be combined or integrated into another system.

In addition, the coupling between the units or the coupling between the components may be direct coupling or indirect coupling, and the coupling includes electrical, mechanical, or other forms of connection.

In addition, the terms "system" and "network" in the embodiments of the present application are often used interchangeably. The term "and/or" is only used for describing an association relationship of the associated objects, which means that there can be three kinds of relationships. For example, A and/or B can indicate three cases where A exists alone, A and B exist at the same time, and B exists alone. The character "/" generally indicates that the associated objects before and after this character are in an "or" relationship.

In the embodiments of the present application, "A corresponding to B" means that A is associated with B, and A can be determined from B. However, it should also be understood that determining A from B does not mean that A is determined only from B, and A can also be determined from B and/or other information.

In sum, those described above are only some embodiments of the technical solutions of the present application, and are not used to limit the protection scope of the present application. Any modification, equivalent replacement, improvement, etc. made within the spirit and principle of the present application shall be included in the protection scope of the present application.

What is claimed is:

1. A method of random access, comprising:
   determining, by a terminal device based on a predetermined rule, whether to cancel transmission of a first uplink channel on a first transmission occasion, the first uplink channel being a Physical Random Access Channel PRACH in a first message of a 2-step random access procedure, and the first transmission occasion being a transmission occasion corresponding to the PRACH; and
   when the terminal device determines to cancel the transmission of the PRACH, cancelling the transmission of the PRACH and not transmitting a second uplink channel by the terminal device, the second uplink channel being a Physical Uplink Shared Channel PUSCH in the first message of the 2-step random access procedure,
   wherein the determining, by the terminal device based on the predetermined rule, whether to cancel the transmission of the first uplink channel on the first transmission occasion comprises that:
   on a Time Division Duplex TDD single carrier, for a set of symbols in the first transmission occasion that are configured by a higher layer for transmission of the first uplink channel, if the terminal device detects a second Downlink Control Information DCI indicating to the terminal device to receive a downlink channel in a subset of symbols from the set of symbols, the terminal device determines to cancel the transmission of the first uplink channel after a first time point, the first time point being a time point after a time length T from a last symbol of a control resource set where the second DCI is detected by the terminal device, wherein the time length T is time for channel processing.

2. The method according to claim 1, wherein the determining, by the terminal device based on the predetermined rule, whether to cancel transmission of the first uplink channel on the first transmission occasion comprises that:
   for a set of symbols in the first transmission occasion that are configured by a higher layer for transmission of the first uplink channel, if the terminal device detects a first DCI carrying slot format information that indicates a subset of symbols from the set of symbols as flexible symbols or downlink symbols, or detects a second DCI indicating to the terminal device to receive a downlink channel in a subset of symbols from the set of symbols, the terminal device determines to cancel the transmission of the first uplink channel after a second time point, the second time point being a time point after a time length T from a last symbol of a control resource set where the first DCI and/or the second DCI is detected by the terminal device, wherein the first time length T is time for channel processing.

3. The method according to claim 1, wherein the determining, by the terminal device based on the predetermined rule, whether to cancel transmission of the first uplink channel on the first transmission occasion comprises that:
   for a set of symbols in the first transmission occasion that are configured by a higher layer for transmission of the first uplink channel, if symbols from the set of symbols are indicated as flexible symbols by an uplink-downlink-configuration-common message and an uplink-downlink-configuration-dedicated message, or the uplink-downlink-configuration-common message and the uplink-downlink-configuration-dedicated message are not provided to the terminal device, and the terminal device does not detect a first DCI with slot format information, the terminal device determines to cancel the transmission of the first uplink channel after a third time point, the third time point being a time point after M symbols from a last symbol of a control resource set used for detecting the first DCI by the terminal device, wherein the M symbols are time for channel processing.

4. The method according to claim 1, wherein the determining, by the terminal device based on the predetermined rule, whether to cancel transmission of the first uplink channel on the first transmission occasion comprises that:
   for symbols that are indicated as downlink symbols by an uplink-downlink-configuration-common message or an uplink-downlink-configuration-dedicated message, the terminal device determines to cancel the transmission of the first uplink channel on the symbols.

5. A terminal device, comprising:
   a processor;
   a memory configured to store a computer program; and
   a transceiver,
   wherein processor is configured to call and run the computer program stored in the memory,
   the processor is configured to determine, based on a predetermined rule, whether to cancel transmission of a first uplink channel on a first transmission occasion, the first uplink channel being a Physical Random Access Channel PRACH in a first message of a 2-step random access procedure, and the first transmission occasion being a transmission occasion corresponding to the PRACH; and
   the transceiver is configured to, when the processor determines to cancel the transmission of the PRACH, cancel the transmission of the PRACH and not transmit a second uplink channel, the second uplink channel being a Physical Uplink Shared Channel PUSCH in the first message of the 2-step random access procedure,
   wherein the processor is further configured to:
   on a TDD single carrier, for a set of symbols in the first transmission occasion that are configured by a higher layer for transmission of the first uplink channel, if the terminal device detects a second DCI indicating to the terminal device to receive a downlink channel in a subset of symbols from the set of symbols, determine to cancel the transmission of the first uplink channel after a first time point, the first time point being a time point after a time length T from a last symbol of a control resource set where the second DCI is detected by the terminal device, wherein the time length T is time for channel processing.

6. The terminal device according to claim 5, wherein the processor is further configured to:
   for a set of symbols in the first transmission occasion that are configured by a higher layer for transmission of the first uplink channel, if the terminal device detects a first DCI carrying slot format information that indicates a subset of symbols from the set of symbols as flexible symbols or downlink symbols, or detects a second DCI indicating to the terminal device to receive a downlink channel in a subset of symbols from the set of symbols, determine to cancel the transmission of the first uplink channel after a second time point, the second time point being a time point after a time length T from a last symbol of a control resource set where the first DCI and/or the second DCI is detected by the terminal device, wherein the first time length T is time for channel processing.

7. The terminal device according to claim 5, wherein the processor is further configured to:
for a set of symbols in the first transmission occasion that are configured by a higher layer for transmission of the first uplink channel, if symbols from the set of symbols are indicated as flexible symbols by an uplink-downlink-configuration-common message and an uplink-downlink-configuration-dedicated message, or the uplink-downlink-configuration-common message and the uplink-downlink-configuration-dedicated message are not provided to the terminal device, and the terminal device does not detect a first DCI with slot format information, determine to cancel the transmission of the first uplink channel after a third time point, the third time point being a time point after M symbols from a last symbol of a control resource set used for detecting the first DCI by the terminal device, wherein the M symbols are time for channel processing.

8. The terminal device according to claim 5, wherein the processor is further configured to:
for symbols that are indicated as downlink symbols by an uplink-downlink-configuration-common message or an uplink-downlink-configuration-dedicated message, determine to cancel the transmission of the first uplink channel on the symbols.

9. A non-transitory computer-readable storage medium for storing a computer program that causes a computer to perform operations comprising:
determining, by a terminal device based on a predetermined rule, whether to cancel transmission of a first uplink channel on a first transmission occasion, the first uplink channel being a Physical Random Access Channel PRACH in a first message of a 2-step random access procedure, and the first transmission occasion being a transmission occasion corresponding to the PRACH; and
when the terminal device determines to cancel the transmission of the PRACH, cancelling the transmission of the PRACH and not transmitting a second uplink channel by the terminal device, the second uplink channel being a Physical Uplink Shared Channel PUSCH in the first message of the 2-step random access procedure,
wherein the determining, by the terminal device based on the predetermined rule, whether to cancel the transmission of the first uplink channel on the first transmission occasion comprises that:
on a TDD single carrier, for a set of symbols in the first transmission occasion that are configured by a higher layer for transmission of the first uplink channel, if the terminal device detects a second DCI indicating to the terminal device to receive a downlink channel in a subset of symbols from the set of symbols, the terminal device determines to cancel the transmission of the first uplink channel after a first time point, the first time point being a time point after a time length T from a last symbol of a control resource set where the second DCI is detected by the terminal device, wherein the time length T is time for channel processing.

10. The storage medium according to claim 9, wherein the determining, by the terminal device based on the predetermined rule, whether to cancel transmission of the first uplink channel on the first transmission occasion comprises that:
for a set of symbols in the first transmission occasion that are configured by a higher layer for transmission of the first uplink channel, if the terminal device detects a first DCI carrying slot format information that indicates a subset of symbols from the set of symbols as flexible symbols or downlink symbols, or detects a second DCI indicating to the terminal device to receive a downlink channel in a subset of symbols from the set of symbols, the terminal device determines to cancel the transmission of the first uplink channel after a second time point, the second time point being a time point after a time length T from a last symbol of a control resource set where the first DCI and/or the second DCI is detected by the terminal device, wherein the first time length T is time for channel processing.

11. The storage medium according to claim 9, wherein the determining, by the terminal device based on the predetermined rule, whether to cancel transmission of the first uplink channel on the first transmission occasion comprises that:
for a set of symbols in the first transmission occasion that are configured by a higher layer for transmission of the first uplink channel, if symbols from the set of symbols are indicated as flexible symbols by an uplink-downlink-configuration-common message and an uplink-downlink-configuration-dedicated message, or the uplink-downlink-configuration- common message and the uplink-downlink-configuration-dedicated message are not provided to the terminal device, and the terminal device does not detect a first DCI with slot format information, the terminal device determines to cancel the transmission of the first uplink channel after a third time point, the third time point being a time point after M symbols from a last symbol of a control resource set used for detecting the first DCI by the terminal device, wherein the M symbols are time for channel processing.

12. The storage medium according to claim 9, wherein the determining, by the terminal device based on the predetermined rule, whether to cancel transmission of the first uplink channel on the first transmission occasion comprises that:
for symbols that are indicated as downlink symbols by an uplink-downlink-configuration-common message or an uplink-downlink-configuration-dedicated message, the terminal device determines to cancel the transmission of the first uplink channel on the symbols.

* * * * *